United States Patent
Haumer et al.

(10) Patent No.: US 11,163,833 B2
(45) Date of Patent: Nov. 2, 2021

(54) DISCOVERING AND DISPLAYING BUSINESS ARTIFACT AND TERM RELATIONSHIPS

(71) Applicant: International Business Machines Corporation, Armonk, NY (US)

(72) Inventors: Peter Haumer, San Jose, CA (US); William J. Scheid, III, Gilroy, CA (US); Stanislav Georgiev, Thornhill (CA); Yan Luo, Burlington (CA); Tala El Hallak, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 482 days.

(21) Appl. No.: 16/123,131

(22) Filed: Sep. 6, 2018

(65) Prior Publication Data
US 2020/0082027 A1  Mar. 12, 2020

(51) Int. Cl.
*G06F 16/00* (2019.01)
*G06F 16/903* (2019.01)
*G06F 3/0486* (2013.01)
*G06F 16/31* (2019.01)
*G06F 16/335* (2019.01)
(Continued)

(52) U.S. Cl.
CPC ...... *G06F 16/90344* (2019.01); *G06F 3/0486* (2013.01); *G06F 16/313* (2019.01); *G06F 16/335* (2019.01); *G06F 16/338* (2019.01); *G06F 16/3334* (2019.01)

(58) Field of Classification Search
CPC .. G06F 16/313; G06F 16/3334; G06F 16/335; G06F 16/338; G06F 16/90344; G06F 3/0481; G06F 3/0486
See application file for complete search history.

(56) References Cited

U.S. PATENT DOCUMENTS

| 5,526,443 A | 6/1996 | Nakayama |
| 6,789,252 B1 | 9/2004 | Burke et al. |

(Continued)

OTHER PUBLICATIONS

Anonymous; "Accelerating digital transformation with groundbreaking API impact analysis"; The Invisible Thread—IBM.com; Dec. 14, 2017; 5 pages <https://www.ibm.com/developerworks/community/blogs/invisiblethread/entry/Accelerating_digital_transformation_with_groundbreaking_API_impact_analysis1?lang=en>.

(Continued)

*Primary Examiner* — Dinku W Gebresenbet
(74) *Attorney, Agent, or Firm* — Cantor Colburn LLP; Teddi Maranzano

(57) ABSTRACT

Aspects include a method for generating an initial ranking of a plurality of discovered keywords, in which the initial ranking is based on confidence levels. The method includes presenting the initial ranking to a user as a list that includes the plurality of discovered keywords. The method includes, in response to receiving a text string as a first input from the user, filtering the list of discovered keywords to generate a refined list of discovered keywords. The filtering includes searching the list of discovered keywords to rank keywords that match the input string using a fuzzy search. The method includes mapping a discovered keyword of the refined list to a business term using a fuzzy search. The method includes updating the initial ranking based on the mapping of the discovered keyword.

20 Claims, 8 Drawing Sheets

(51) Int. Cl.
*G06F 16/338* (2019.01)
*G06F 16/33* (2019.01)

(56) References Cited

U.S. PATENT DOCUMENTS

| | | | |
|---|---|---|---|
| 7,908,305 B2 | 3/2011 | Baxter et al. | |
| 8,387,025 B2 | 2/2013 | Surasinghe | |
| 9,081,785 B2 | 7/2015 | Mandelstein et al. | |
| 9,703,850 B2 | 7/2017 | Bhide et al. | |
| 2004/0243557 A1 | 12/2004 | Broder | |
| 2007/0006190 A1 | 1/2007 | Surasinghe | |
| 2009/0259482 A1 | 10/2009 | Baxter et al. | |
| 2011/0145005 A1* | 6/2011 | Cao | G06Q 10/10 705/1.1 |
| 2011/0179026 A1* | 7/2011 | Mulligen | G06F 16/313 707/728 |
| 2012/0124547 A1* | 5/2012 | Halbedel | G06F 16/903 717/100 |
| 2013/0110861 A1* | 5/2013 | Roy | G06F 16/3329 707/765 |
| 2013/0282363 A1 | 10/2013 | Fan | |
| 2014/0164399 A1 | 6/2014 | Mandelstein et al. | |
| 2015/0242477 A1 | 8/2015 | Bhide et al. | |

OTHER PUBLICATIONS

Anonymous; "Discovering the business terms"; IBM Application Delivery Intelligence 5.0.4; Saved from the World Wide Web Sep. 5, 2018; 2 pages <https://www.ibm.com/support/knowledgecenter/en/SSKK7E_5.0.4/com.ibm.adi.product.doc>.

Anonymous; "Performing the business terms discovery"; IBM Application Delivery Intelligence 5.0.4; Saved from the World Wide Web Sep. 5, 2018; 2 pages <https://www.ibm.com/support/knowledgecenter/en/SSKK7E_5.0.4/com.ibm.adi.product.doc>.

Dogan et al.; "Formalisation and Mapping of Terminologies for Systems of Systems Engineering Thesaurus"; 2013 8th International Conference on System of Systems Engineering; 6 pages.

Fazziki et al.; "A Service Oriented information system: a model driven approach"; 2012 Eighth International Conference on Signal Image Technology and Internet Based Systems; 8 pages.

Garcia et al.; "Object-Business Process Mapping Frameworks: Abstractions, Architecture, and Implementation" 2014 IEEE 18th International Enterprise Distributed Object Computing Conference; 10 pages.

List of IBM Patents or Patent Applications Treated as Related; Date Filed: Sep. 6, 2018, 2 pages.

Luo et al.; "Predicting Keywords in an Application"; U.S. Appl. No. 15/989,485, filed May 25, 2018.

Mell et al.; "The NIST Definition of Cloud Computing—Recommendations of the National Institute of Standards and Technology"; U.S. Department of Commerce; Sep. 2011; 7 pages.

Telang et al.; "Specifying and Verifying Cross-Organizational Business Models: An Agent-Oriented Approach"; IEEE Transactions on Services Computing, vol. 5, No. 3, Jul.-Sep. 2012; 14 pages.

* cited by examiner

DISCOVERING AND DISPLAYING BUSINESS ARTIFACT AND TERM RELATIONSHIPS

The following disclosure(s) are submitted under 35 U.S.C. 102(b)(1)(A) as prior disclosures by, or on behalf of, a sole inventor of the present application or a joint inventor of the present application:

Aspects of the present invention have been disclosed by the Applicant, who obtained the subject matter disclosed directly from the inventors, in the product IBM® Application Discovery & Delivery Intelligence Version 5.0.4, made available to the public on Dec. 14, 2017.

BACKGROUND

The present invention generally relates to business rule mining, and more specifically, to discovering and displaying artifact and term relationships.

Business terms are words or vocabulary that are specific to a certain business or part of the business. Business rule mining is a process of discovering business logic in relation to business terms, such as how car insurance premiums are calculated or how medical records are registered and incorporating them into application code. Mining business rules can be particularly difficult in legacy applications, such as those including mainframe COBOL program artifacts. Legacy applications can be old and complex, and may not be organized and maintained in the same ways that new or smaller applications might be. In old legacy systems business rules are often hidden and encapsulated by legacy programming languages. Many enterprises have very large legacy programming systems and find it necessary to extract business rules for many reasons that may include easier and better maintenance, extracting more business value by creating external interfaces to business logic, transforming the legacy systems into more modern programming languages etc. Discovered business rules can be converted into natural language and analyzed by business analysts or architects, so that they can be validated, tracked, and updated over time.

An early step in discovering business rules is identifying keywords in legacy applications, as business rules usually incorporate keywords. However, program artifacts of legacy applications are not necessarily easy to understand by business analysts, and a legacy application may include a massive number of program artifacts. Software developers follow specific programming language syntax, grammar, and conventions to compose the program artifacts, and these must be translated into keywords and business logic before business analysts can begin to understand legacy applications.

SUMMARY

Embodiments of the present invention provide a computer-implemented method for discovering and displaying business artifact and term relationships. A non-limiting example of the computer-implemented method includes generating, by a system comprising one or more processors, an initial ranking of a plurality of discovered keywords, in which the plurality of discovered keywords are keywords obtained via an automated keyword discovery process. The initial ranking is based on confidence levels, in which each confidence level indicates a respective likelihood that a respective discovered keyword of the plurality of discovered keywords represents a business term. The method includes presenting, by the system, the initial ranking to a user as a list comprising the plurality of discovered keywords. The method includes, in response to receiving a text string as a first input from the user, filtering the list of discovered keywords to generate a refined list of discovered keywords, in which the filtering includes searching the list of discovered keywords to rank keywords that match the input string using a fuzzy search. The method includes mapping a discovered keyword of the refined list to a business term using a fuzzy search. The mapping includes mapping, to the business term, the one or more software artifacts that are linked to the discovered keyword. The method includes updating the initial ranking based on the mapping of the discovered keyword.

Embodiments of the present invention are directed to a system for discovering and displaying business artifact and term relationships. The system includes one or more processors that are configured to perform a method. A non-limiting example of the method includes generating, by the system, an initial ranking of a plurality of discovered keywords, in which the plurality of discovered keywords are keywords obtained via an automated keyword discovery process. The initial ranking is based on confidence levels, in which each confidence level indicates a respective likelihood that a respective discovered keyword of the plurality of discovered keywords represents a business term. The method includes presenting, by the system, the initial ranking to a user as a list comprising the plurality of discovered keywords. The method includes, in response to receiving a text string as a first input from the user, filtering the list of discovered keywords to generate a refined list of discovered keywords, in which the filtering includes searching the list of discovered keywords to rank keywords that match the input string using a fuzzy search. The method includes mapping a discovered keyword of the refined list to a business term using a fuzzy search. The mapping includes mapping, to the business term, the one or more software artifacts that are linked to the discovered keyword. The method includes updating the initial ranking based on the mapping of the discovered keyword.

Embodiments of the invention are directed to a computer program product for discovering and displaying business artifact and term relationships, the computer program product comprising a computer readable storage medium having program instructions embodied therewith. The program instructions are executable by a system comprising one or more processors to cause the system to perform a method. A non-limiting example of the method includes generating, by the system, an initial ranking of a plurality of discovered keywords, in which the plurality of discovered keywords are keywords obtained via an automated keyword discovery process. The initial ranking is based on confidence levels, in which each confidence level indicates a respective likelihood that a respective discovered keyword of the plurality of discovered keywords represents a business term. The method includes presenting, by the system, the initial ranking to a user as a list comprising the plurality of discovered keywords. The method includes, in response to receiving a text string as a first input from the user, filtering the list of discovered keywords to generate a refined list of discovered keywords, in which the filtering includes searching the list of discovered keywords to rank keywords that match the input string using a fuzzy search. The method includes mapping a discovered keyword of the refined list to a business term using a fuzzy search. The mapping includes mapping, to the business term, the one or more software artifacts that are linked to the discovered keyword. The method includes updating the initial ranking based on the mapping of the discovered keyword.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
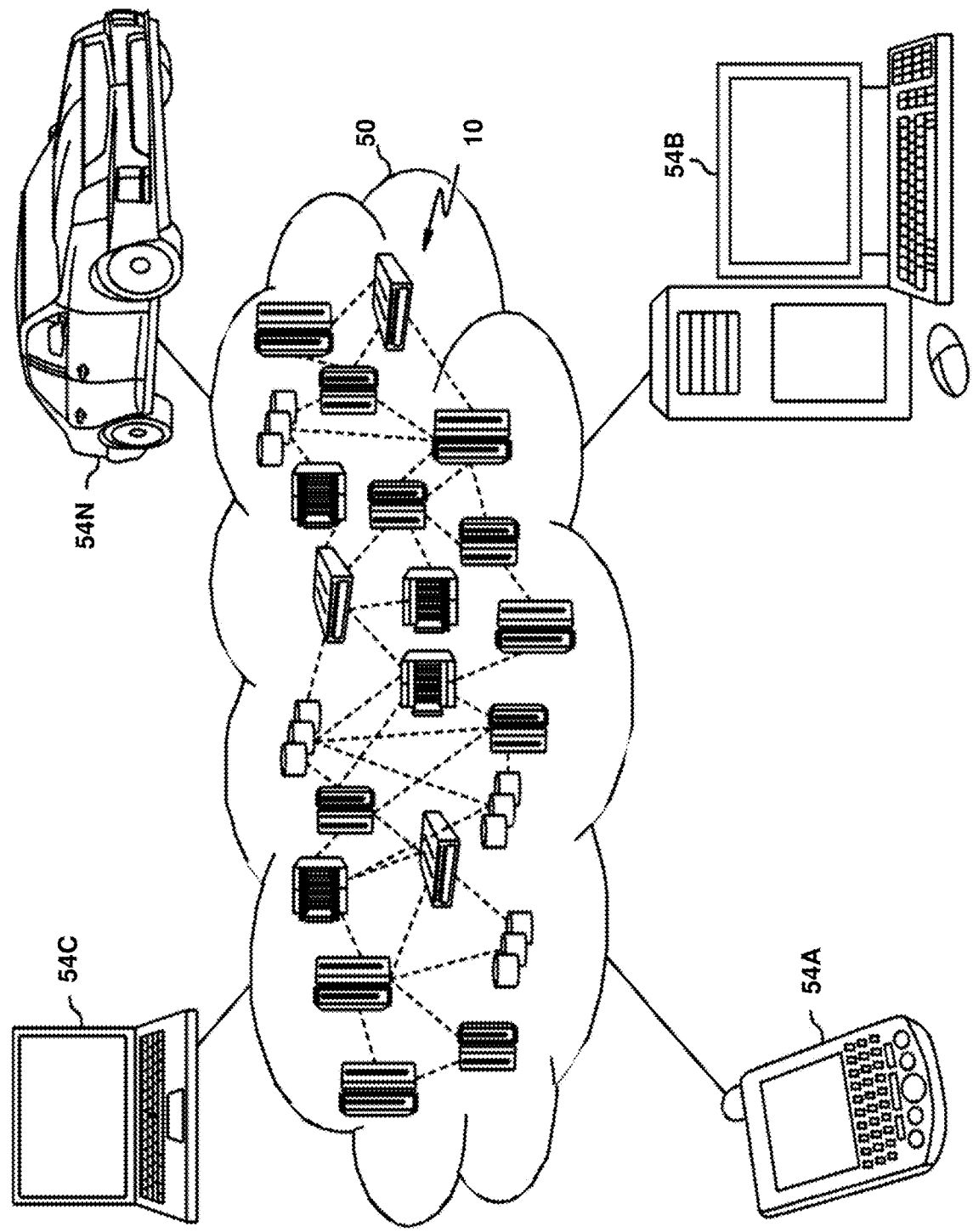
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
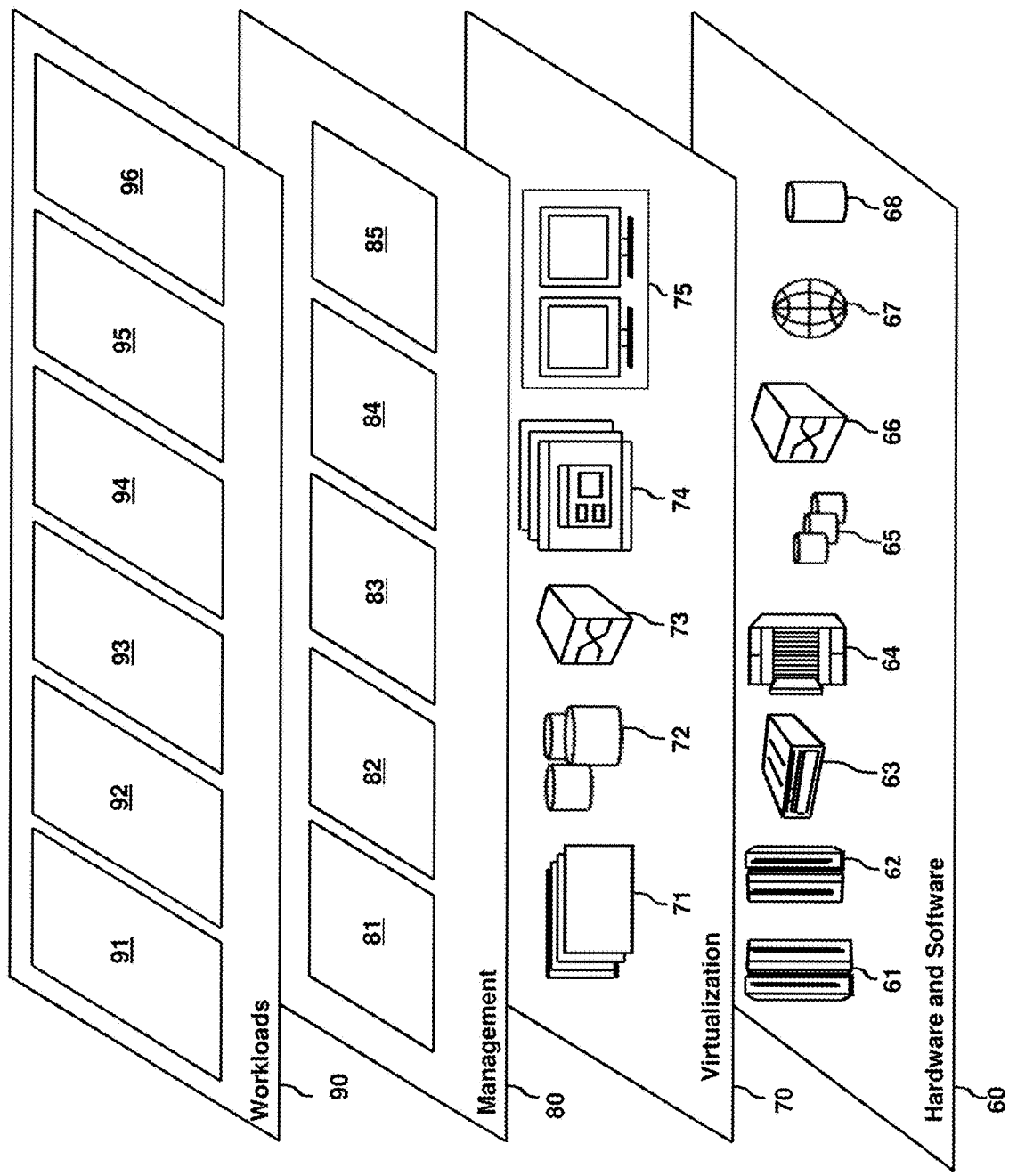
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and business artifact and keyword discovery processing 96.

Turning now to an overview of technologies that are more specifically relevant to aspects of the invention, in various scenarios differences between programming languages and natural language can cause communication gaps between software developers and business analysts. For example, in the context of a legacy application, an analyst would need to manually find important terms (i.e., keywords) and associate them with business logic (e.g., business terms) for each program artifact in the legacy application. This process is often a time-consuming and tedious process, especially in situations where an analyst is not familiar with the legacy application or where the size of the legacy application is large.

Some developers utilize computer-aided software engineering (CASE) tools to find evidence and occurrences of business rule, terms, and properties within software artifacts such as source code, documentation, and specifications using various search mechanisms. In some scenarios, business terms are spelled and referenced in syntactically significant different ways within software artifacts as well as used differently in different contexts. Accordingly, only humans can decide on the accuracy of such findings using prior tools such as by, for example, determining if an occurrence of an implementation name in a software artifact is an accurate finding of a business term occurrence. Presently, no tool exists that can assist in accomplishing such mappings of terms to candidate keywords (i.e. discovered keywords) that supports the viewing of terms to candidate keywords and of terms side-by-side and performs systematic compare and match operations that are driven by a user's established priorities.

Figure 4:
FIG. 4 is a diagram of an example user interface in accordance with one or more embodiments of the present invention, in which the user interface includes a side-by-side view.

Turning now to an overview of the aspects of the invention, one or more embodiments of the invention address the above-described shortcomings of the prior art by providing a system for discovering keywords in program artifacts automatically and displaying a list of the discovered keywords next to a list of potential business terms. FIG. 4 illustrates one such example of a side-by side-view of a user interface (UI) in accordance with one or more embodiments of the present invention. The system augments the side-by-side view with smart ranking and filtering to enable an effective and goal-driven match-up between keywords and potential business terms. In some embodiments of the present invention, this side-by-side presentation facilitates the mapping of the discovered keywords to a specific user model of terms in various ways. For example, in some embodiments of the present invention, the system allows for reducing the set of potential matches on a left side of the view (e.g., list of discovered keywords) by various ways of sorting, ranking, and filtering, and/or allows for filtering of the list of discovered keywords on the left side of the view by typing in strings to be used for sub-string filtering to allow for focusing on words that match a particular subset of strings. In some embodiments of the present invention, the ranking option that is supported by the left side of the view is based on a confidence score (e.g., confidence levels) that is calculated based on a combination of factors.

Figure 3:
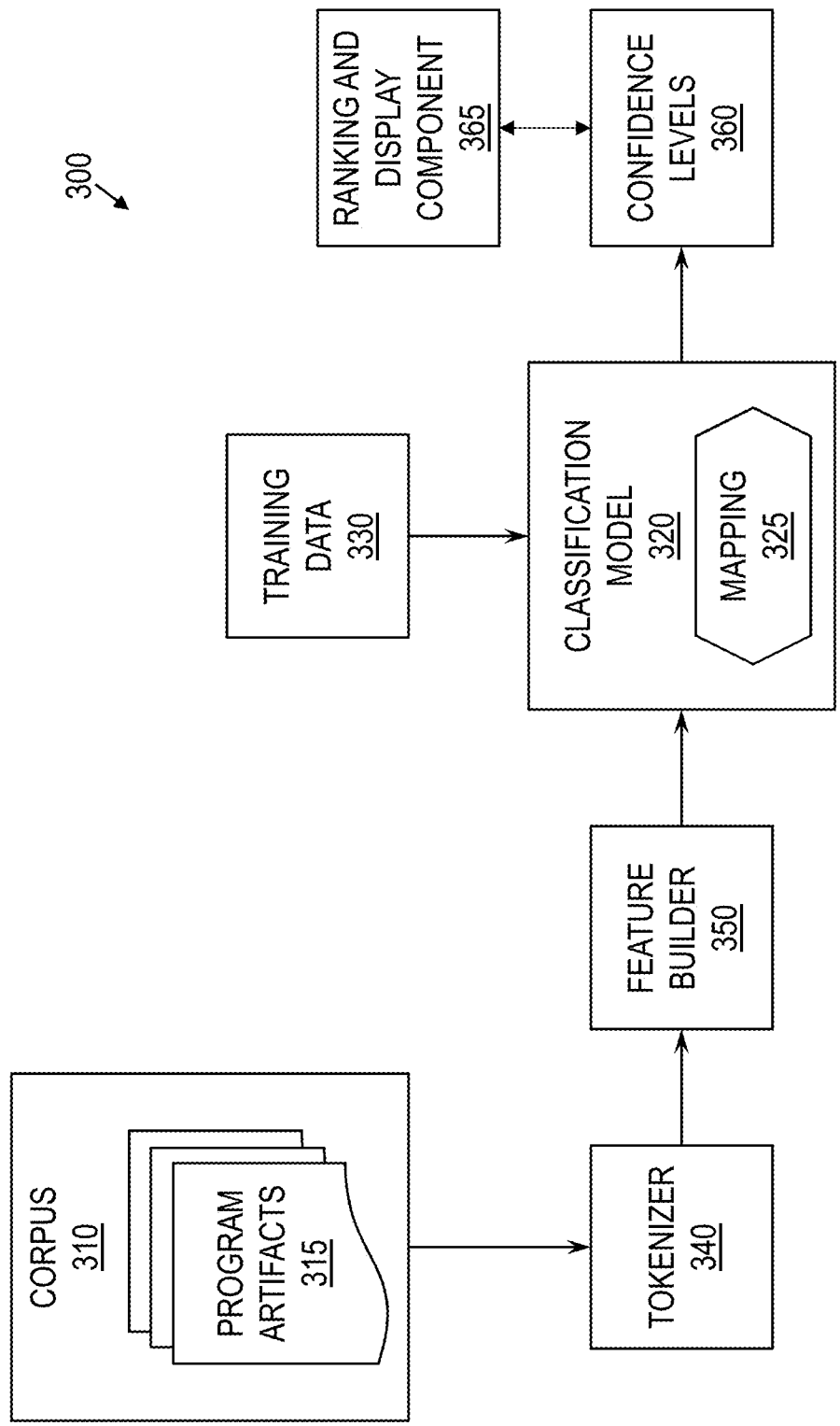
FIG. 3 is a block diagram of a discovery and display system according to one or more embodiments of the present invention.

Turning now to a more detailed description of aspects of the present invention, FIG. 3 is a block diagram of a discovery and display system 300 according to one or more embodiments of the invention. Discovery and display system 300 is configured to predict, or determine, which terms in one or more program artifacts 315 of corpus 310 are keywords and then display the discovered keywords in a list that is side-by-side with a list of business terms. In some embodiments of the present invention, corpus 310 represents the whole of an application, such as a legacy application, that is being analyzed. In some embodiments of the present invention, discovery and display system 300 includes a classification model 320, in which classification model 320 is trained with training data 330 to produce a mapping 325. In some embodiments of the present invention, classification model 320 produces mapping 325 by mapping a feature vector, which is associated with a term identified in a program artifact 315, to a confidence level 360 (e.g., confidence score), in which confidence level 360 represents a likelihood that the associated term is a keyword.

In some embodiments of the present invention, discovery and display system 300 includes a tokenizer 340 and a feature builder 350, which together generate input for the classification model 320 based on one or more program artifacts 315. Generally, tokenizer 340 is configured to extract candidate terms from program artifacts 315 of corpus 310, and feature builder 350 is configured to build a feature vector for each candidate term. Each of the tokenizer 340 and the feature builder 350 may include hardware, software, or a combination of both. For instance, each of the tokenizer 340 and the feature builder 350 may be a software module or a specialized hardware circuit. Each candidate term and its associated feature vector may be submitted to the classification model 320, which may output a confidence level 360 indicating whether the candidate term is a keyword.

In some embodiments of the present invention, tokenizer 340 is configured to take as input one or more program artifacts 315 and output a plurality of terms. In other words, in some embodiments of the present invention, tokenizer 340 tokenizes program artifacts 315. In some embodiments of the present invention, each program artifact 315 is a source file or portion of a source file that is incorporated into a program, such as a legacy application. For example, and not by way of limitation, in some embodiments of the present invention, program artifact 315 is a source code file, a MAP file, a copybook, or a library. In some embodiments of the present invention, a term is a one-word phrase representing an entity or concept in program artifact 315. For example, and not by way of limitation, in some embodiments of the present invention, a term is a variable name, a constant value, a symbol, or a word in comments. In some embodiments of the invention, tokenizer 340 is, or incorporates, a scanner or parser that allows for parsing text such as computer code as known in the art. Existing scanners and parsers are able to extract terms from program artifacts 315.

Some terms are reserved in certain languages. For example, the terms "public," "private," and "class" are reserved in the programming language Java, while the terms "a," "an," and "the" are reserved in the English language. These reserved terms typically do not convey useful or substantive information, but they serve a purpose such as annotation or to provide contextual or structural information within the programming language. In some embodiments of the present invention, discovery and display system 300 assumes that reserved terms are not keywords, and thus tokenizer 340 removes reserved terms from consideration. This may require knowledge of the programming languages used in program artifacts 315. Thus, in some embodiments of the present invention, tokenizer 340 has access to a list of reserved terms in each programming language to enable recognition of those terms. In some embodiments of the present invention, reserved terms are ignored when terms are being extracted, or alternatively, reserved terms may be removed from the set of terms identified after terms are extracted from the program artifact 315. The remaining terms, which are not reserved, are referred to as candidate terms. For instance, an example COBOL statement is as follows: "MOVE DB2-PATIENT-ID TO CA-PATIENT-ID. COPY HCERRSPD." After tokenization, including the removal of the reserved terms MOVE, TO, and COPY, the remaining candidate terms are the following: {DB2-PATIENT-ID, CA-PATIENT-ID, HCERRSPD}.

Feature builder 350 is configured to input one or more terms, which may be candidate terms, and to output a feature vector for each term. In some embodiments of the present invention, the feature vector is an ordered set of feature values, including a respective value in each field, in which each field represents a specific feature. In some embodiments of the present invention, the feature is a measurable property or metric. In some embodiments of the present invention, feature builder 350 is configured to examine the various program artifacts 315 to evaluate the features to be included in the feature vector. Because each feature is a measurable property, one of skill in the art will understand how to construct feature builder 350 to establish the value of each feature for each term. Informative, discriminating, and independent feature vectors can be useful in differentiating important terms from unimportant ones. In some embodiments of the present invention, each feature represented in a feature vector is a factor that is being considered for determination of whether terms are keywords.

In some embodiments of the present invention, the features represented in a feature vector include a subset of language-independent features and language-dependent features. The language-independent features are independent of the programming language in which a term is written. Program artifacts 315 are written either directly or indirectly by humans, and thus certain features are related to characteristics of natural language, regardless of the specific language in which program artifact 315 is written. In contrast, language-dependent features are relevant to a specific programming language. Syntax, styles, and conventions vary across programming languages. Thus, accuracy can be improved in discovering keywords by the consideration of language-dependent features that are selected with awareness of an applicable programming language. While the features considered as a whole may vary from one embodiment of the present invention to another, the language-dependent features may further vary based on the program languages of program artifacts 315. In some embodiments of the present invention, only language independent features are utilized, or only language-dependent features are utilized. In some embodiments of the present invention, language independent features and/or language-dependent features are utilized.

In some embodiments of the present invention, the features that are represented in a feature vector is one or more of the following: term length, term frequency (i.e. the number of occurrences), document frequency, first appearance, and/or Term Frequency-Inverse Document Frequency (TF-IDF). In some embodiments of the present invention, the features that are represented in a feature vector is one or more of the following for program artifacts 315 written in COBOL: relatedness to a copybook, relatedness to a database, relatedness to business logic, and relatedness to imported keywords.

In some embodiments of the present invention, relatedness to a copybook refers to a measurement of similarity between a term in question and a COBOL copybook file. A copybook is a program artifact 315 that defines data elements referenced by other program artifacts 315. A term that is related to a copybook is likely to be a keyword. To determine relatedness to a copybook, in some embodiments of the present invention, each term found in each copybook is compared to the term in question, and the greatest similarity between these comparisons may be used as the value of this feature. In some embodiments of the present invention, an edit distance, such as the Levenshtein distance, is used as the measure of similarity between terms when determining the value of this feature or others. Thus, in some embodiments of the present invention, the highest Levenshtein distance between the term in question and each of the various terms in the copybooks of corpus 310 is used as the value of this feature.

In some embodiments of the present invention, relatedness to business logic statements refers to the similarity between a term in question in various business logic statements that are identified in the corpus 310. If a term is involved in a business logic statement, then it is likely to be a keyword. For instance, in some embodiments of the present invention, a business logic statement appears in program artifacts 315 as a conditional statement, a statement involving one or more tables or arrays, a SQL statements, or other suitable statements. It will be understood that a mechanism for identification of a business logic statement in the program artifacts 315 may vary between embodiments. As with relatedness to a copybook, in some embodiments of the present invention, the term in question is compared to each term found in each business logic statement and the highest similarity value is used as the value of this feature.

In some embodiments of the present invention, relatedness to imported keywords refers to the similarity between a term in question and known keywords. In some embodiments of the present invention, one or more keywords are known, due to having been submitted as keywords by a user or having been previously identified as keywords. As with relatedness to a copybook, in some embodiments of the present invention, the term in question is compared to each known keyword and the highest similarity value may be used as the value of this feature.

In some embodiments of the present invention, feature builder 350 is configured to construct a feature vector for each term received as input. The number of dimensions in the feature vectors, as well as the features incorporated, need not always be as described herein. Rather, the features described above as included in the feature vector are provided for illustrative purposes only, and it will be understood that the size and features of the feature vector may vary from one embodiment to another. In some embodiments of the invention, the features considered may be fixed through training of classification model 320 and assignment of confidence levels 360. However, a value of a feature for a particular term may be left unassigned, or null, if that value cannot be established. A feature vector may be viewed as a description of the corresponding term and may be used to determine the confidence level 360 that the term is a keyword. Specifically, the classification model 320 may map a feature vector for a term to a confidence level 360 for the term.

Discovery and display system 300 includes a ranking and display component 365. In some embodiments of the present invention, ranking and display component 365 is configured to display a list of discovered keywords next to a list of potential business terms within a side-by-side presentation of a UI, in which ranking and display component 365 in combination with classification model 320 and confidence levels 360 facilitate the mapping of discovered keywords to a specific user model of terms. FIG. 4 illustrates an example UI 400 that includes a side-by-side view in accordance with one or more embodiments of the present invention. In general, ranking and display component 365 is configured to display in a side-by-side presentation list of discovered keywords next to a list of potential business terms and to augment the side-by-side view of UI 400 with smart ranking and filtering that enables an effective and goal-driven matching between keywords and potential business terms.

Ranking and display component 365 is configured to facilitate the mapping of the discovered keywords to a specific user model of terms in various ways via support with classification model 320 and the generated confidence levels 360. For example, in some embodiments of the present invention, ranking and display component 365 is configured to reduce a set of potential matches on a left side of the side-by-side view presented in UI 400 (e.g., list of discovered keywords) by various ways of sorting, ranking, and filtering in response to receiving an input by a user.

For example, in some embodiments of the present invention, ranking and display component 365 is configured to reduce the set of potential matches on a left side of the side-by-side view by ranking the set of potential matches based on the confidence levels 360 (e.g., confidence scores) that were calculated by classification model 320. In some embodiments of the present invention, the confidence levels 360 as established by classification model 320 based on a combination of factors such as an overall confidence of a term's qualification as being a representative term and on an automated mapping of the discovered keywords against business terms. In some embodiments of the present invention, the overall confidence of a term's qualification as being a representative term is determined based on various heuristics and on the amount of evidence that is available for the term in question (e.g., occurrences of the implementation name of the term and synonyms of the term). In some embodiments of the present invention, the automated mapping of the discovered keywords is a mapping of discovered keywords against business terms that is based on using a fuzzy-search based algorithm, in which keywords that map very well are ranked higher than the ones that do not map well.

In some embodiments of the present invention, ranking and display component 365 is configured to reduce the set of potential matches by filtering the list of discovered keywords in response to receiving a text string from a user. For example, in some embodiments of the present invention, text strings are entered by a user into the left side of the side-by-side view and the text strings are then used for sub-string filtering to allow for focusing on words that match a particular subset of strings.

In some embodiments of the present invention, ranking and display component 365 is configured to annotate each keyword with all the evidence that is found for the keyword as well as potential synonyms that were automatically grouped with the keyword during the keyword discovery process.

In some embodiments of the present invention, the system allows for interactive matching and ranking through association through various user-driven commands and/or input such as by, for example, a dragging and dropping user interface (UI) paradigm that allows for dragging of items from one list to the other. In some embodiments of the present invention, the interactive matching and ranking of results allow for a new traceability set of copied relationships because mappings to software artifacts that were recorded for the discovered keywords are now inherited to the mapped business terms. A refined list on the right of UI 400 that can now be ranked by the amount of evidence found for a term (e.g., the number of artifacts that are mapped and the number of implementation names/synonyms that are found).

In addition to matching, in some embodiments of the present invention, the UI 400 can be used for discovering all new business terms following the same process of discovery and ranking. In some embodiments of the present invention, instead of matching a discovered keyword to an existing term, the system can promote a keyword to become a new term that was previously not captured.

In some embodiments of the present invention, ranking and display component 365 includes hardware, software, or a combination of both. For instance, in some embodiments of the present invention, ranking and display component 365 is software module or a specialized hardware circuit.

Figure 5:
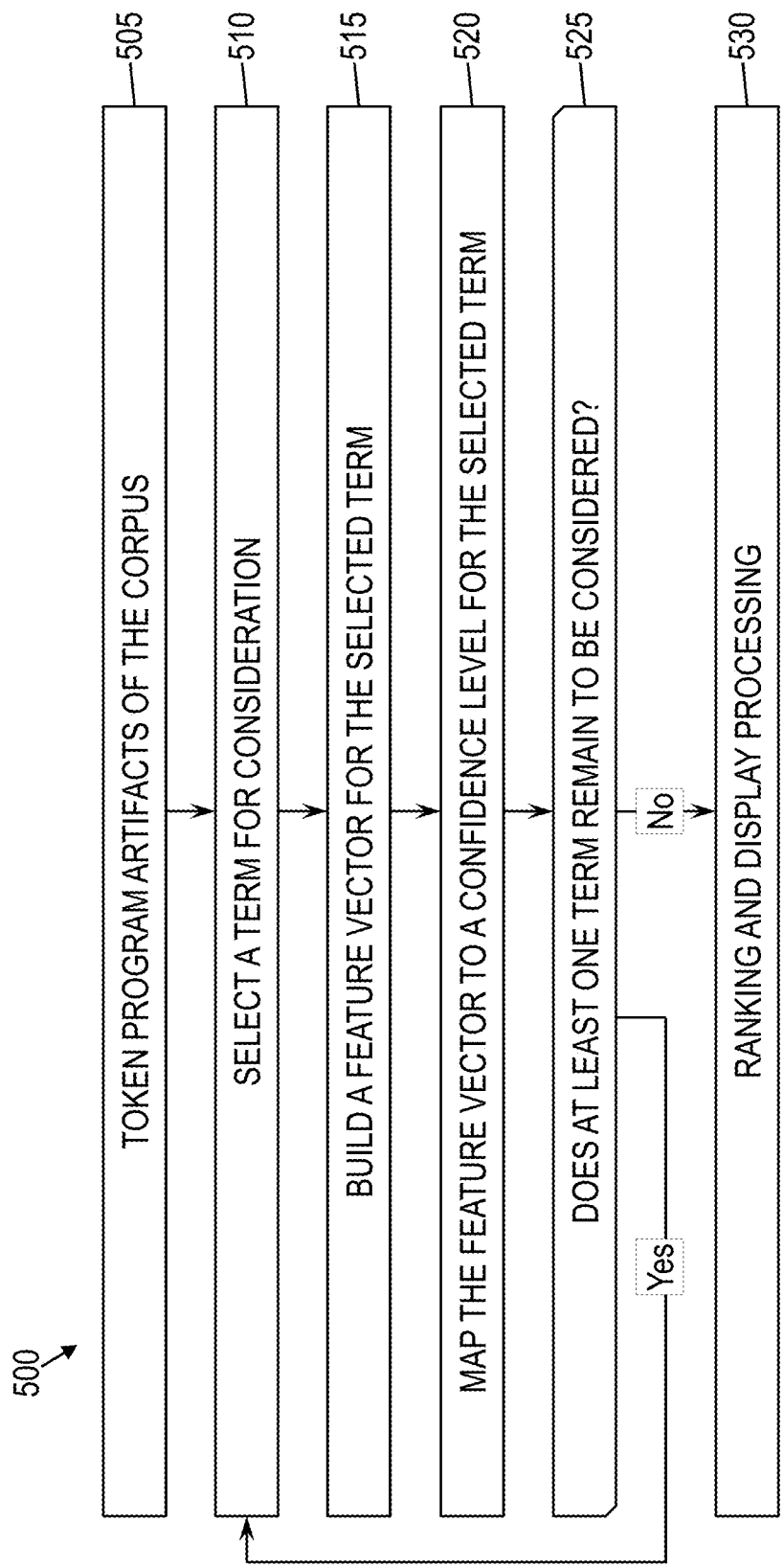
FIG. 5 is a flow diagram of an example methodology for predicting and presenting keywords accordance with according to one or more embodiments of the present invention.

FIG. 5 is a flow diagram of a method 500 for predicting keywords in program artifacts 315 of the corpus 310 and presenting the identified keywords in accordance with one or more embodiments of the present invention. This method 500 may use a classification model 320 that was previously trained.

At block 505, the various program artifacts 315 of the corpus 310 may be tokenized into a plurality of terms. In some embodiments of the invention, these resulting terms may exclude reserved terms. At block 510, a term may be selected for consideration. Each of the terms resulting from tokenization may be selected at some point, and blocks 515-520 below may be performed on each of such terms individually. The focus on each term may be performed, for example, in serial or in parallel.

At block 515, a feature vector may be built for the selected term. To this end, for each feature to be included in the feature vector, the feature builder 350 may determine the value of the feature based on the various program artifacts 315 in the corpus 310.

At block 520, the feature vector may be mapped to a confidence level 360, according to the trained classification model 320. The resulting confidence level 360 may represent the likelihood that the selected term is a keyword.

At decision block 525, it may be determined whether at least one additional term remains to be assigned a confidence level 360. If so, then the method 500 may return to block 510 to select another term. If no additional terms exist, then the method 500 may continue to block 530 to perform ranking and display processing (e.g., via ranking and display component 365).

After the various terms to be considered have been assigned confidence levels 360, at block 530, ranking and display processing is performed. For example, and not by way of limitation, in some embodiments of the present invention, ranking and display processing includes various terms being ranked according to their confidence levels 360, such that a user can later utilize this ranking in business mining tasks. For another example, each term with a confidence level 360 meeting a threshold level may be considered a keyword. In some embodiments of the invention, terms deemed to be keywords are to be grouped together based on similarity, such as having a string in common. In that case, the longest string in common within a group may be extracted to represent the group as a whole. In some embodiments of the present invention, the longest string is deemed to be business term. Business terms, other keywords, or both may be output or may be used to generate a description of the corpus 310 as a whole, thus enabling a user to better understand the function of a legacy application or other application represented by the corpus 310.

Figure 6:
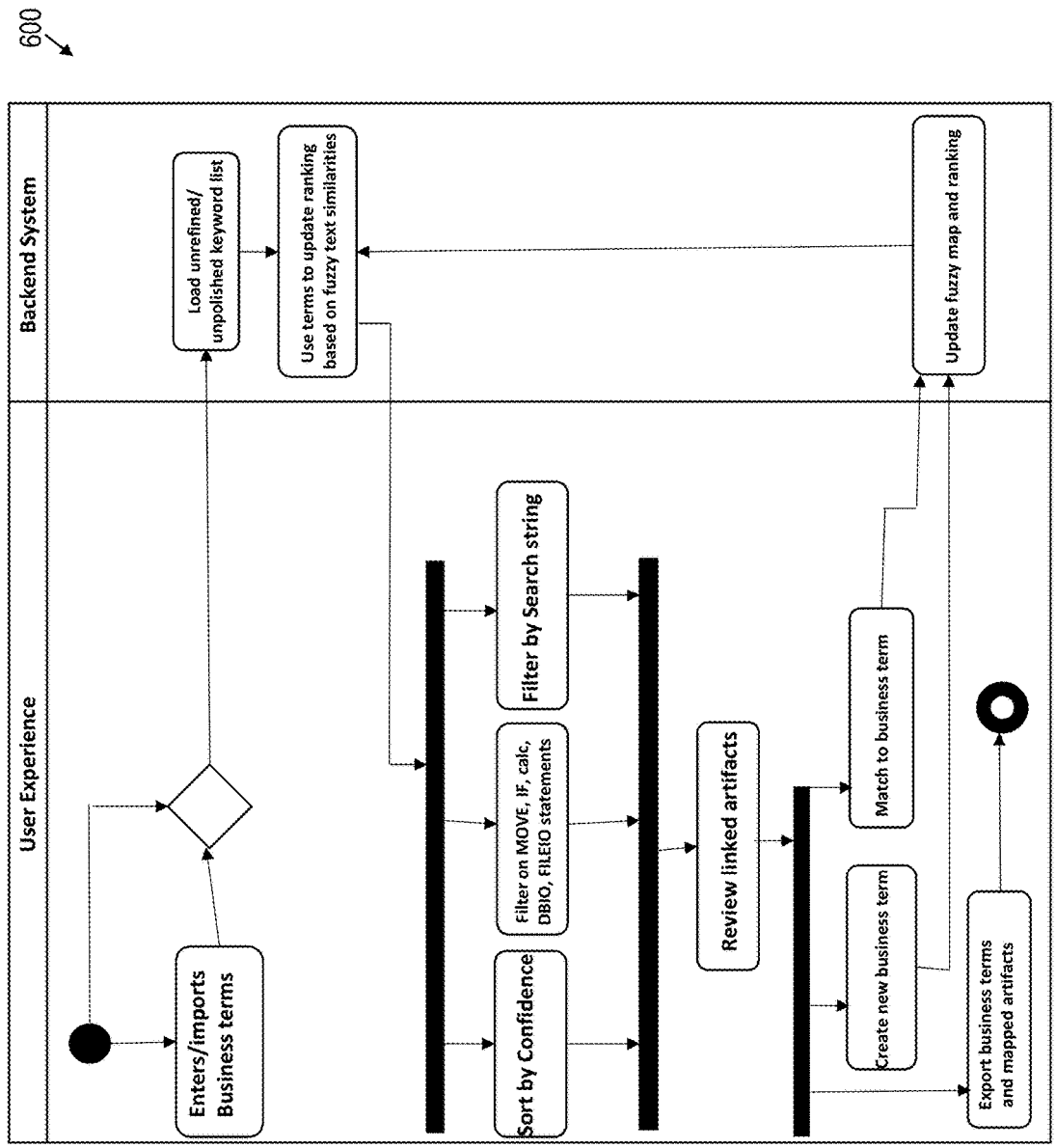
FIG. 6 is a activity diagram illustrating an example workflow for performing ranking and display processing in accordance with one or more embodiments of the present invention, in which the workflow depicts a user experience with the system of FIG. 3.

FIG. 6 is a flow diagram illustrating an example workflow 600 for performing ranking and display processing in accordance with one or more embodiments of the present invention, in which workflow 600 depicts a user experience with a system (e.g., discovery and display system 300). In some embodiments of the present invention, a user begins by entering business terms and suspected implementation names into the system that the user wants to focus on and that the user suspects have occurrences in source code to be analyzed. In some embodiments of the present invention, the entering of business terms is performed by the user manually. In some embodiments of the present invention, the entering of business terms is performed by importing known business term lists stored in files or databases into the system automatically. In some embodiments of the present invention, a user does not enter business terms and/or suspected implementation names into the system, but rather the system starts with an empty list. The system then uses a mix of algorithms that are described in more detail below, to create an initial ranking of all the discovered keywords.

In some embodiments of the present invention, if business terms were entered by the user, then the initial ranking will take account of those business terms over other ranking criteria. For example, in some embodiments of the present invention, if business terms were entered by the user, the system uses the entered business terms to perform the initial ranking based, at least in part, on fuzzy text similarities. The system then provides access to the newly ranked list to the user experience via one or more pages that are presented on a user interface (e.g., UI 400). The present pages include a plurality of refinement options that can be selected and/or utilized by the user. A first refinement option allows the user to request that the system sort the initial ranking of discovered keywords based on confidence level (e.g., confidence level 360). A second refinement option allows the user to request that the system filter the initial ranking of discovered keywords based on keywords that appear in the context of a specific language construct, such as for example, only keywords that appear in COBOL MOVE statements or as part of FILEIO-related statements, and/or used as part of rule-like IF statements, etc. A third refinement option allows the user to request that the system filter the initial ranking of discovered keywords based on search strings that would rank keywords that fuzzy match the string entered in a search field of the UI. The third refinement option allows the user to review for potential keywords without the need of having to create a business term or implementation name on the right first.

In some embodiments of the present invention, after the system presents the user with a refined list of discovered keywords, the user then reviews the linked artifacts that the system found for these keywords during the initial discovery process. The user is then able to decide whether to map the keyword to an existing term or create an entirely new business term. In some embodiments of the present invention, in both cases the user is able to map the keyword via a drag-and-drop gesture of moving a keyword from the left of UI 400 and dropping it on top of an existing term on the right of UI 400 or dropping it at the end or middle of the right of UI 400 to create a new business term.

In some embodiments of the present invention, the newly updated/created business term is then used by the system to again refine the ranking of the keyword list as more input is now available to the algorithm with the newly added relationship. In some embodiments of the present invention, the refining includes updating a fuzzy map and ranking that is used by the system to rank the keywords. After that, the loop in the flow starts again and the user can map more elements from the refined list or change the viewing/refinement options again.

The semi-automated mapping described above uses a unique new combination of initial confidence, refined confidence levels based on matching to the business terms, interactive removal of false positives, as well as ranking of the results based on the amount of real-world evidence found in software artifacts, which leads to a highly efficient way of working and higher quality results as compared to prior approaches. Moreover, the described approach allows for working with much larger sets of artifacts and terms as compared to prior approaches as the tool facilitates and ranks based on the best matches. Furthermore, the approach lays the foundations for machine-based learning from the daily usage of the tool and the specific choices made in each session improving suggestions for future decisions.

In regards to keywords and business terms fuzzy searching, in some embodiments of the present invention, the fuzzy search is based on calculating edit distances between two terms or phrases. In some embodiments of the present invention, each term or phrase is a string, in which the edit distance is the minimum number of operations required to transform one string into the other. For example, the edit distance between 'ca-patient' and 'patient' would be three because the prefix 'ca-' of 'ca-patient' needs to be removed to be transformed into 'patient'. Various suitable edit distance algorithms can be utilized as known to those having ordinary skill in the art, such as for example, by applying Levenshtein or Wagner-Fischer algorithm.

One example similarity measurement between a first string (s1) and a second string (s2) can be measured based on the following formula:

$$\text{similarity} = 1 - \text{editDistance}/\text{maxLength}\ (s1, s2)$$

where maxLength represents the maximum string size between s1 and s2.

In some embodiments of the present invention, given a discovered keyword and a list of business terms, a maximum similarity is calculated between the keyword in question and the business terms using the formula above to enable fuzzy matching. This formula is useful primarily for situations where the strings are from the same language.

However, in some scenarios, keywords or implementation names are written in different programming languages, in which each programing language includes a different and specific syntax, grammar, and/or conventions. Accordingly, applying regular edit distance algorithms to situations such as those may yield inaccurate results. For example, the similarity between keyword 'db-pat-id' and business term 'Patient Identifier' (they both refer to the same concept) calculated using the above algorithm comes out to be only 16%.

To address this potential issue, in some embodiments of the present invention, a keyword preprocessing algorithm is executed to extend a keyword into a string set containing all variants of the keyword. In some embodiments of the present invention, the execution of the keyword preprocessing algorithm includes learning programming conventions and styles, replacing abbreviations (using at least one of an acronym and synonym database), and combining different orders of terms in a phrase of the discovered keyword, in which the maximum similarity is calculated using the string set of variants.

Different programming languages or even different software projects have different conventions or styles. In some embodiments of the present invention, the learning of the programming convention and styles includes scanning and analyzing source code to learn different types of convention metadata. In some embodiments of the present invention, the learning includes learning how a phrase is written in a specific software project. For example, in Java, a phrase 'Patient Identifier' will be usually written as 'patientID' using camelCase. Underscore is widely in Python such as 'patient_id'. In COBOL, a hyphen is used to separate terms such as 'ca-pat-id'. In addition, COBOL has some frequent or reserved prefixes such as 'ca' represents 'Common Area'. Those common prefixes do not convey conceptual meanings, thus, in some embodiments of the present invention, the prefixes are removed from the implementation names to enhance the similarity calculation.

In regards to the replacing of abbreviations, in some embodiments of the present invention, abbreviations are replaced using one or more of an acronym and synonyms database. In some embodiments of the present invention, the acronym and synonyms databases are obtained from an external domain database and/or are maintained and contributed by end users. As such, in some embodiments of the present invention, any frequently occurred abbreviations with conceptual meanings are replaced by a full definition in natural language, such as replacing 'db' using 'Database'.

In regards to combining different orders of terms in a phrase, as some phrases found in keyword are written in different orders (as compared to in regular natural languages), in some embodiments of the present invention different combinations of terms are considered. For example, 'Birth date' could be written in 'date-of-birth' in a programming language, thus consideration of different combinations can be used to enhance the similarity calculation.

By way of example, as a result of the above preprocessing process, the keyword 'db-pat-id' would be extended into a string set containing all its variants such as {'dbpatid', 'patid', 'Database Patient Id', 'Patient Identifier', 'PatientId', . . . }. This set of variants can then be used to calculate the maximum similarity between the business term 'Patient Identifier' and can produce a similarity of 100%.

Referring back to FIG. 4, in some embodiments of the present invention, ranking and display component 365 supports a collaborative user experience. For example, in some embodiments of the present invention, when multiple users work on the same set of keywords and business term data at the same time, ranking and display component 365 is configured to provide user-specific views on the data, by, for example, prioritizing the ranking based on terms that the current user has entered over terms coming from the other users. In some embodiments of the present invention, new terms and mappings that are created by other users will cause an impact on the view of the current user. The rankings shift as new relationships appear. To provide transparency of those changes to all users, the user experience, in some embodiments of the present invention, ranking and display component 365 causes an event feed view to be displayed to the users that shows all the operations and manipulations of other users made in the system.

Figure 7:
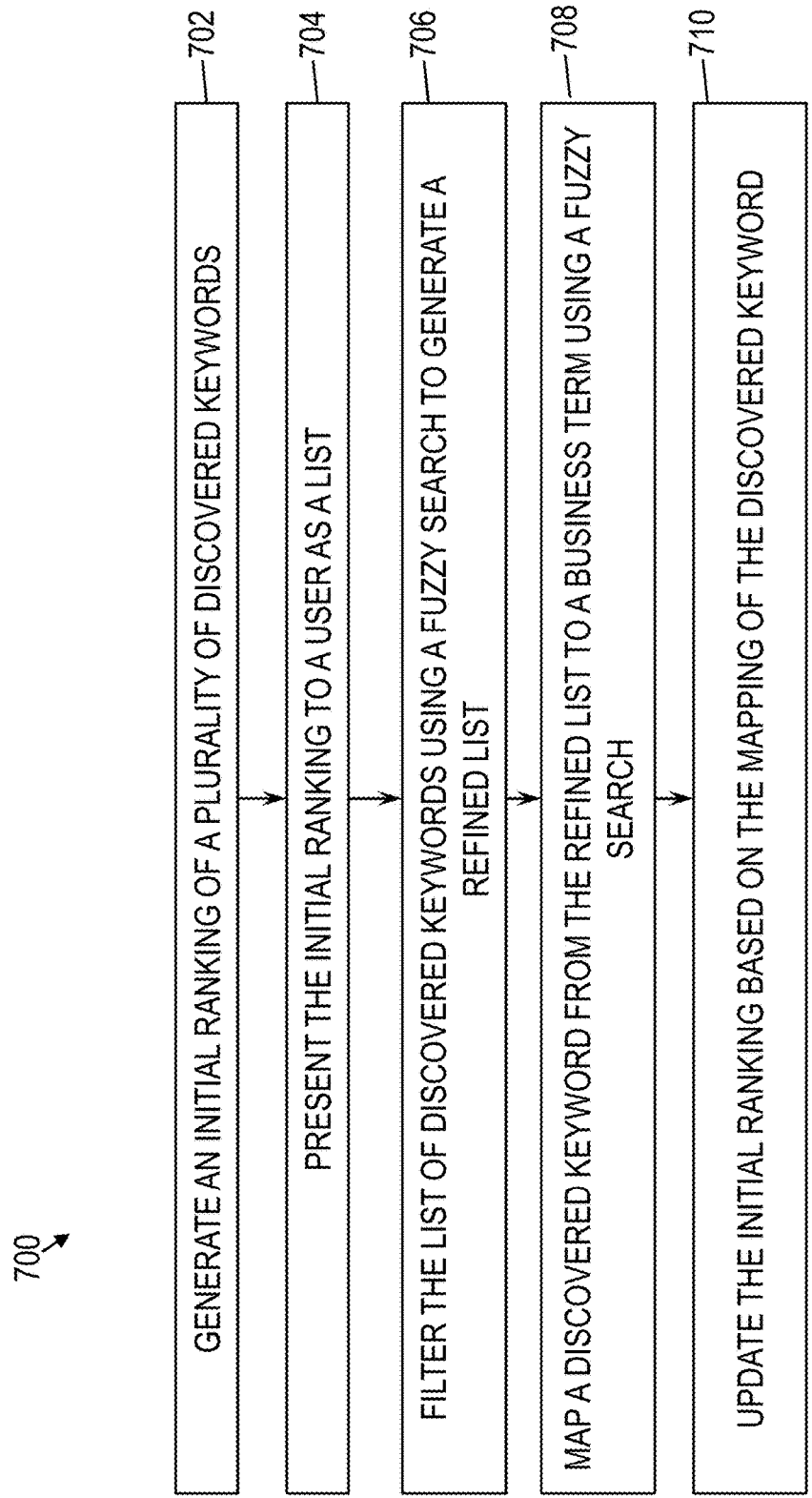
FIG. 7 depicts a flow diagram illustrating another example methodology in accordance with one or more embodiments of the present invention.

Additional details of the operation of prediction and display system 300 will now be described with reference to FIG. 7, wherein FIG. 7 depicts a flow diagram illustrating a methodology 700 according to one or more embodiments of the present invention. At block 702, an initial ranking of a plurality of discovered keywords is generated, in which the plurality of discovered keywords are keywords obtained via an automated keyword discovery process. The initial ranking is based on confidence levels, in which each confidence level indicates a respective likelihood that a respective discovered keyword of the plurality of discovered keywords represents a business term. At block 704, the initial ranking is presented to a user as a list comprising the plurality of discovered keywords. At block 706, in response to receiving a text string as a first input from the user, the list of discovered keywords is filtered in response to receiving a text string as a first input from the user to generate a refined list of discovered keywords. The filtering includes searching the list of discovered keywords to rank the keywords that match the input string using a fuzzy search. At block 708, at least one discovered keyword of the refined list is mapped to at least one business term using a fuzzy search. In some embodiments of the present invention, the mapping includes mapping, to the business term, the one or more software artifacts that are linked to the discovered keyword. At block 710, the initial ranking is updated based on the mapping of the discovered keyword.

In some embodiments of the present invention, each discovered keyword in the list of discovered keywords is annotated with possible synonyms and evidence that was automatically obtained from the automated keyword discovery process. In some embodiments of the present invention, the refined list of discovered keywords is further generated by filtering the list of discovered keywords based on keywords appearing within predetermined programing language constructs.

In some embodiments of the present invention, the methodology further includes importing a plurality of business terms from the user and then presenting the user with a list of the imported business terms, in which the creating of the initial ranking is based on the imported plurality of business terms. In some embodiments of the present invention, the importing further includes implementation a list of suspected implementation names. In some embodiments of the present invention, the presenting of the list of discovered keywords includes displaying the list of discovered keywords in a first column portion of a user interface (e.g., left side of UI 400). In some embodiments of the present invention, the presenting of the list of imported business terms includes displaying the list of business terms in a second column portion of the user interface (e.g., right side of UI 400).

In some embodiments of the present invention, the mapping of a discovered keyword of the refined list to a business term using the fuzzy search is performed in response to receiving a drag-and-drop input from the user, in which the drag-and-drop input includes moving a keyword from the first column portion into the second column portion (e.g., from left side of UI 400 to right side of UI 400).

In some embodiments of the present invention, the mapping of a discovered keyword of the refined list to a business term using the fuzzy search includes calculating a maximum similarity between the discovered keyword and the plurality of business terms of the list of imported business terms. In some embodiments of the present invention, the methodology further includes executing a keyword preprocessing algorithm that extends the discovered keyword into a string set comprising variants of the discovered keyword, in which the execution of the keyword preprocessing algorithm includes learning programming conventions and styles, replacing abbreviations using at least one of an acronym or synonym database, and/or combining different orders of terms in a phrase of the discovered keyword. The maximum similarity is then calculated using the string set of variants.

Figure 8:
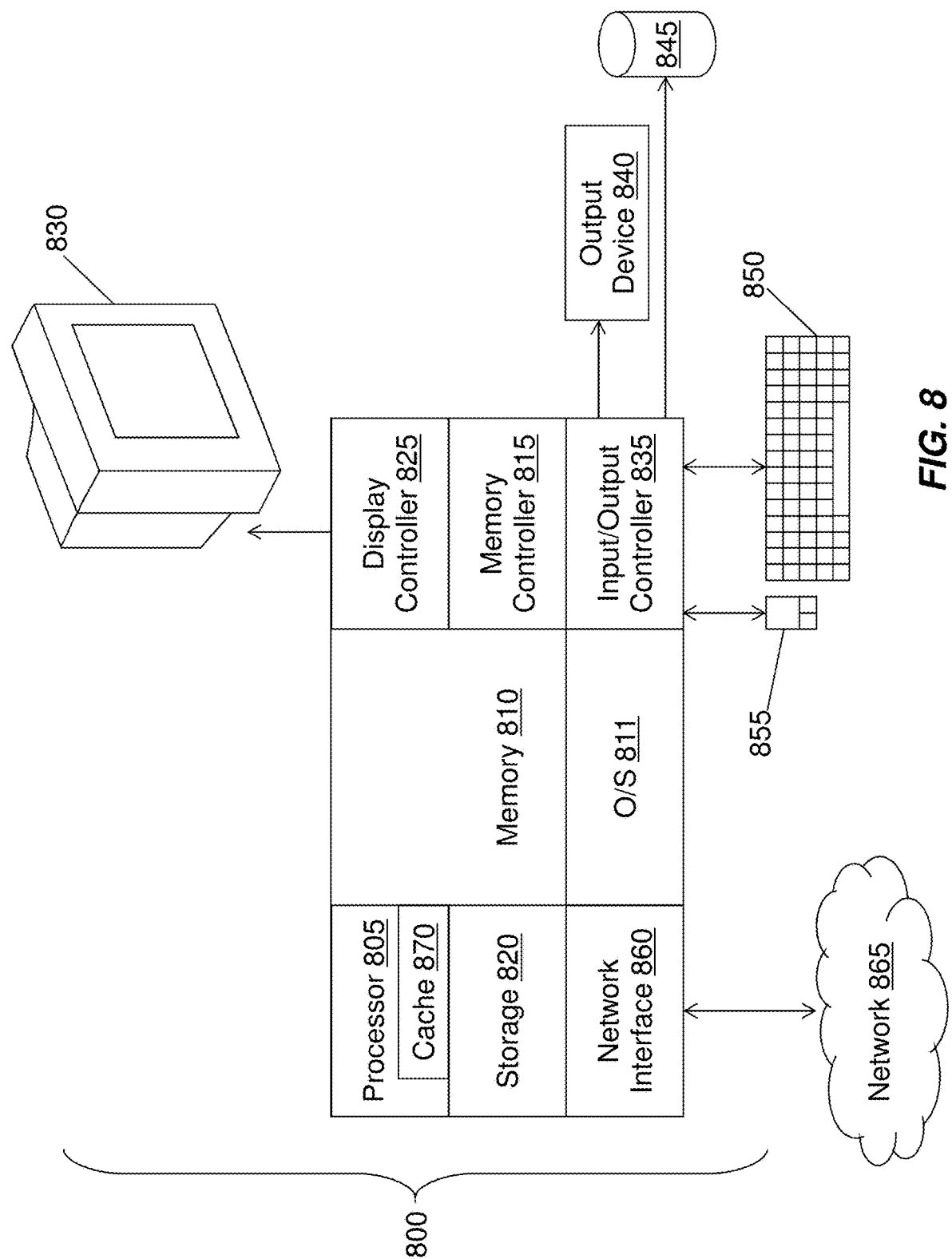
FIG. 8 depicts an exemplary computer system capable of implementing one or more embodiments of the present invention.

The discovery and display systems 300 and methods identified above may be embodied, in whole or in part, in computer program products or in computer systems 800, such as that illustrated in FIG. 8.

FIG. 8 is a block diagram of a computer system 800 for implementing some or all aspects of the system, according to some embodiments of this invention. Discovery and display system 300 and methods described herein may be implemented in hardware, software (e.g., firmware), or a combination thereof. In some embodiments, the methods described may be implemented, at least in part, in hardware and may be part of the microprocessor of a special or general-purpose computer system 800, such as a personal computer, workstation, minicomputer, or mainframe computer.

In some embodiments, as shown in FIG. 8, the computer system 800 includes a processor 805, memory 810 coupled to a memory controller 815, and one or more input devices 845 and/or output devices 840, such as peripherals, that are communicatively coupled via a local I/O controller 835. These devices 840 and 845 may include, for example, a printer, a scanner, a microphone, and the like. Input devices such as a conventional keyboard 850 and mouse 855 may be coupled to the I/O controller 835. The I/O controller 835 may be, for example, one or more buses or other wired or wireless connections, as are known in the art. The I/O controller 835 may have additional elements, which are omitted for simplicity, such as controllers, buffers (caches), drivers, repeaters, and receivers to enable communications.

The I/O devices 840, 845 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 810. The processor 805 may be a custom made or commercially available processor, a central processing unit (CPU), an auxiliary processor among several processors associated with the computer system 800, a semiconductor based microprocessor (in the form of a microchip or chip set), a macroprocessor, or other device for executing instructions. The processor 805 includes a cache 870, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 870 may be organized as a hierarchy of more cache levels (L1, L2, etc.).

The memory 810 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, or other types of storage media. Note that the memory 810 may have a distributed architecture, where various components are situated remote from one another but may be accessed by the processor 805.

The instructions in memory 810 may include one or more separate programs, each of which comprises an ordered listing of executable instructions for implementing logical functions. In the example of FIG. 8, the instructions in the memory 810 include a suitable operating system (OS) 811. The operating system 811 essentially may control the execution of other computer programs and provides scheduling, input-output control, file and data management, memory management, and communication control and related services.

Additional data, including for example, instructions for the processor 405 or other retrievable information, may be stored in storage 820, which may be a storage device such as a hard disk drive or solid-state drive. The stored instructions in memory 810 or in storage 820 may include those enabling the processor to execute one or more aspects of discovery and display system 300 and methods of this disclosure.

The computer system 800 may further include a display controller 825 coupled to a display 830. In some embodiments, the computer system 800 may further include a network interface 860 for coupling to a network 865. The network 865 may be an IP-based network for communication between the computer system 800 and an external server, client and the like via a broadband connection. The network 865 transmits and receives data between the computer system 800 and external systems. In some embodiments, the network 865 may be a managed IP network administered by a service provider. The network 865 may be implemented in a wireless fashion, e.g., using wireless protocols and technologies, such as WiFi, WiMax, etc. The network 865 may also be a packet-switched network such as a local area network, wide area network, metropolitan area network, the Internet, or other similar type of network environment. The network 865 may be a fixed wireless network, a wireless local area network (LAN), a wireless wide area network (WAN) a personal area network (PAN), a virtual private network (VPN), intranet or other suitable network system and may include equipment for receiving and transmitting signals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for discovering and displaying business artifact and term relationships comprising:

generating, by a system comprising one or more processors, an initial ranking of a plurality of discovered keywords, wherein the plurality of discovered keywords are keywords obtained, from one or more software artifacts including computer source code, via an automated keyword discovery process, wherein the initial ranking is based on confidence levels, wherein each confidence level indicates a respective likelihood that a respective discovered keyword of the plurality of discovered keywords represents a business term;

presenting, by the system, the initial ranking to a user as a list comprising the plurality of discovered keywords;

in response to receiving a text string as a first input from the user, filtering the list of discovered keywords to generate a refined list of discovered keywords, wherein the filtering includes searching the list of discovered keywords to rank keywords that match the input string using a fuzzy search;

mapping, by the system, a discovered keyword of the refined list to a business term using a fuzzy search, wherein the mapping includes mapping, to the business term, one or more software artifacts that are linked to the discovered keyword; and updating, by the system, the initial ranking based on the mapping of the discovered keyword.

2. The computer-implemented method of claim 1, wherein each discovered keyword in the list of discovered keywords is annotated with possible synonyms and evidence that was automatically obtained from the automated keyword discovery process.

3. The computer-implemented method of claim 1, wherein the refined list of discovered keywords is further generated by filtering the list of discovered keywords based on keywords appearing within predetermined programing language constructs.

4. The computer-implemented method of claim 1 further comprising:

importing a plurality of business terms from the user, wherein the generating of the initial ranking is based on the imported plurality of business terms; and presenting to the user a list of the imported business terms;

wherein the presenting of the list of discovered keywords includes displaying the list of discovered keywords in a first column portion of a user interface (UI);

wherein the presenting of the list of the imported business terms includes displaying the list of business terms in a second column portion of the UI.

5. The computer-implemented method of claim 4, wherein the mapping of a discovered keyword of the refined list to a business term using the fuzzy search is performed in response to receiving a drag-and-drop input from the user, wherein the drag-and-drop input includes moving a keyword from the first column portion into the second column portion.

6. The computer-implemented method of claim 4, wherein the mapping of a discovered keyword of the refined list to a business term using the fuzzy search includes calculating a maximum similarity between the discovered keyword and the plurality of business terms of the list of the imported business terms.

7. The computer-implemented method of claim 6 further comprising:

executing a keyword preprocessing algorithm that extends the discovered keyword into a string set comprising variants of the discovered keyword, wherein the execution of the keyword preprocessing algorithm includes learning programming conventions and styles, replacing abbreviations using at least one of an acronym or synonym database, and combining different orders of terms in a phrase of the discovered keyword, wherein the maximum similarity is calculated using the string set of variants.

8. A computer program product for discovering and displaying business artifact and term relationships, the computer program product comprising a computer readable storage medium having program instructions embodied therewith, the program instructions executable by a system comprising one or more processors to cause the system to perform a method, the method comprising:

generating, by the system, an initial ranking of a plurality of discovered keywords, wherein the plurality of discovered keywords are keywords obtained, from one or more software artifacts including computer source code, via an automated keyword discovery process, wherein the initial ranking is based on confidence levels, wherein each confidence level indicates a respective likelihood that a respective discovered keyword of the plurality of discovered keywords represents a business term;

presenting, by the system, the initial ranking to a user as a list comprising the plurality of discovered keywords;

in response to receiving a text string as a first input from the user, filtering the list of discovered keywords to generate a refined list of discovered keywords, wherein the filtering includes searching the list of discovered keywords to rank keywords that match the input string using a fuzzy search;

mapping, by the system, a discovered keyword of the refined list to a business term using a fuzzy search, wherein the mapping includes mapping, to the business term, one or more software artifacts that are linked to the discovered keyword; and updating, by the system, the initial ranking based on the mapping of the discovered keyword.

9. The computer program product of claim 8, wherein each discovered keyword in the list of discovered keywords is annotated with possible synonyms and evidence that was automatically obtained from the automated keyword discovery process.

10. The computer program product of claim 8, wherein the refined list of discovered keywords is further generated by filtering the list of discovered keywords based on keywords appearing within predetermined programing language constructs.

11. The computer program product of claim 8, wherein the method further comprising:

importing a plurality of business terms from the user, wherein the generating of the initial ranking is based on the imported plurality of business terms; and presenting to the user a list of the imported business terms;

wherein the presenting of the list of discovered keywords includes displaying the list of discovered keywords in a first column portion of a user interface (UI);

wherein the presenting of the list of the imported business terms includes displaying the list of business terms in a second column portion of the UI.

12. The computer program product of claim 11, wherein the mapping of a discovered keyword of the refined list to a business term using the fuzzy search is performed in response to receiving a drag-and-drop input from the user, wherein the drag-and-drop input includes moving a keyword from the first column portion into the second column portion.

13. The computer program product of claim 11, wherein the mapping of a discovered keyword of the refined list to a business term using the fuzzy search includes calculating a maximum similarity between the discovered keyword and the plurality of business terms of the list of the imported business terms.

14. The computer program product of claim 13, wherein the method further includes:

executing a keyword preprocessing algorithm that extends the discovered keyword into a string set comprising variants of the discovered keyword, wherein the execution of the keyword preprocessing algorithm includes learning programming conventions and styles, replacing abbreviations using at least one of an acronym or synonym database, and combining different orders of terms in a phrase of the discovered keyword, wherein the maximum similarity is calculated using the string set of variants.

15. A system for discovering and displaying business artifact and term relationships, the system comprising one or more processors configured to perform a method, the method comprising:

generating, by the system, an initial ranking of a plurality of discovered keywords, wherein the plurality of discovered keywords are keywords obtained, from one or more software artifacts including computer source code, via an automated keyword discovery process, wherein the initial ranking is based on confidence levels, wherein each confidence level indicates a respective likelihood that a respective discovered keyword of the plurality of discovered keywords represents a business term;

presenting, by the system, the initial ranking to a user as a list comprising the plurality of discovered keywords;

in response to receiving a text string as a first input from the user, filtering the list of discovered keywords to generate a refined list of discovered keywords, wherein the filtering includes searching the list of discovered keywords to rank keywords that match the input string using a fuzzy search;

mapping, by the system, a discovered keyword of the refined list to a business term using a fuzzy search, wherein the mapping includes mapping, to the business term, one or more software artifacts that are linked to the discovered keyword; and updating, by the system, the initial ranking based on the mapping of the discovered keyword.

16. The system of claim 15, wherein the refined list of discovered keywords is further generated by filtering the list of discovered keywords based on keywords appearing within predetermined programing language constructs.

17. The system of claim 15, wherein the method further comprising:

importing a plurality of business terms from the user, wherein the generating of the initial ranking is based on the imported plurality of business terms; and presenting to the user a list of the imported business terms;

wherein the presenting of the list of discovered keywords includes displaying the list of discovered keywords in a first column portion of a user interface (UI);

wherein the presenting of the list of the imported business terms includes displaying the list of business terms in a second column portion of the UI.

18. The system of claim 17, wherein the mapping of a discovered keyword of the refined list to a business term using the fuzzy search is performed in response to receiving a drag-and-drop input from the user, wherein the drag-and-drop input includes moving a keyword from the first column portion into the second column portion.

19. The system of claim 17, wherein the mapping of a discovered keyword of the refined list to a business term using the fuzzy search includes calculating a maximum similarity between the discovered keyword and the plurality of business terms of the list of the imported business terms.

20. The system of claim 19, wherein the method further includes:

executing a keyword preprocessing algorithm that extends the discovered keyword into a string set comprising variants of the discovered keyword, wherein the execution of the keyword preprocessing algorithm includes learning programming conventions and styles, replacing abbreviations using at least one of an acronym or synonym database, and combining different orders of terms in a phrase of the discovered keyword, wherein the maximum similarity is calculated using the string set of variants.

* * * * *